United States Patent [19]

Williamson

[11] Patent Number: 4,574,891
[45] Date of Patent: Mar. 11, 1986

[54] AGRICULTURAL TOOL CLAMP

[75] Inventor: Gerald E. Williamson, Macomb, Ill.

[73] Assignee: Yetter Manufacturing Company, Colchester, Ill.

[21] Appl. No.: 682,281

[22] Filed: Dec. 14, 1984

[51] Int. Cl.[4] .................. A01B 35/20; A01B 39/22
[52] U.S. Cl. ................................ 172/763; 172/602
[58] Field of Search ............ 172/602, 572, 573, 744, 172/763, 603, 748

[56] References Cited

U.S. PATENT DOCUMENTS

| 1,097,339 | 5/1914 | Lauterbach | 172/602 |
| 1,292,697 | 1/1919 | Brigden | 172/603 X |
| 3,351,139 | 11/1967 | Schmitz | 172/602 |
| 3,912,019 | 10/1975 | Baughman | 172/763 |
| 4,002,206 | 1/1977 | Eisenhardt | 172/763 |

OTHER PUBLICATIONS

Yetter Disc-Chisel Advertizing Brochure #2565-166, Yetter Mfg. Co., Colchester, Il.

Primary Examiner—Richard J. Johnson
Attorney, Agent, or Firm—McWilliams, Mann, Zummer and Sweeney

[57] ABSTRACT

A clamp arrangement is provided for mounting an agricultural tool to a tool bar or cross bar. The clamp includes an upper clamp plate and a lower plate which are bolted to the bar and slotted to receive a vertical support bar. The vertical support bar is positioned vertically by means of a slotted clamp member which may be disposed above the upper clamp plate or below the lower clamp plate, the clamp member is fixed to the vertical bar by a set screw. Clearances are provided to absorb horizontal loads imposed on the agricultural implement.

4 Claims, 6 Drawing Figures

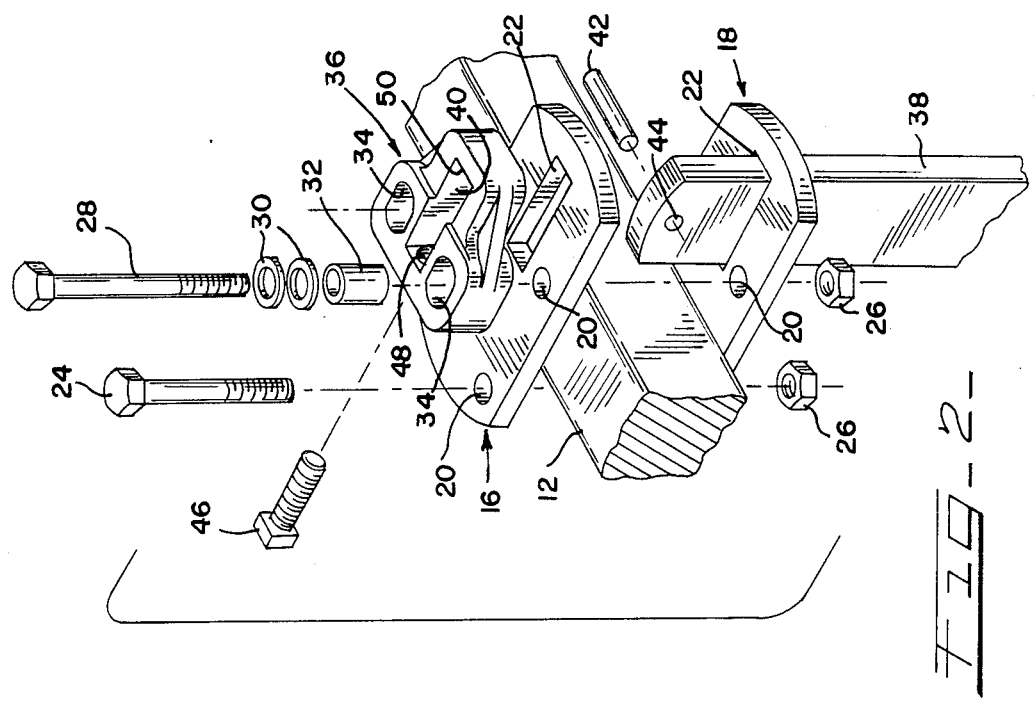
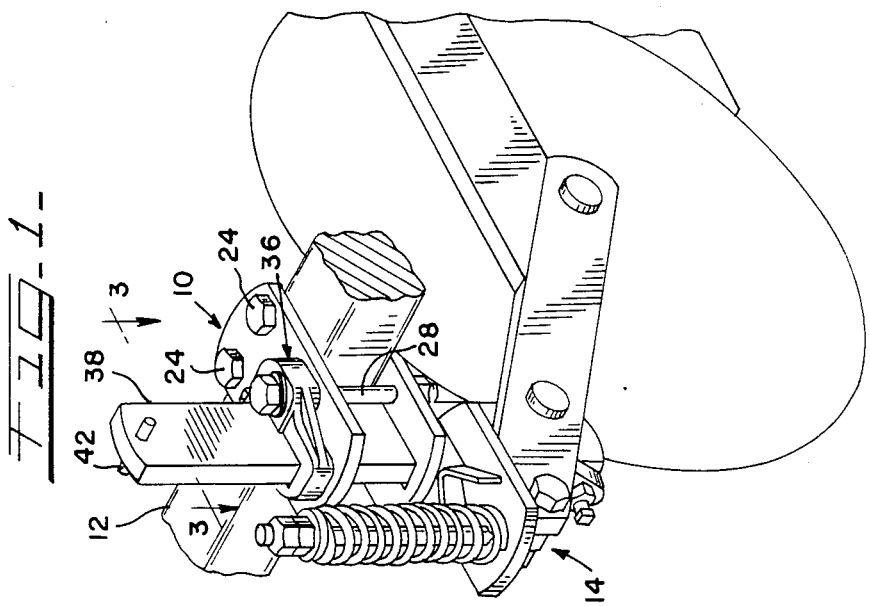

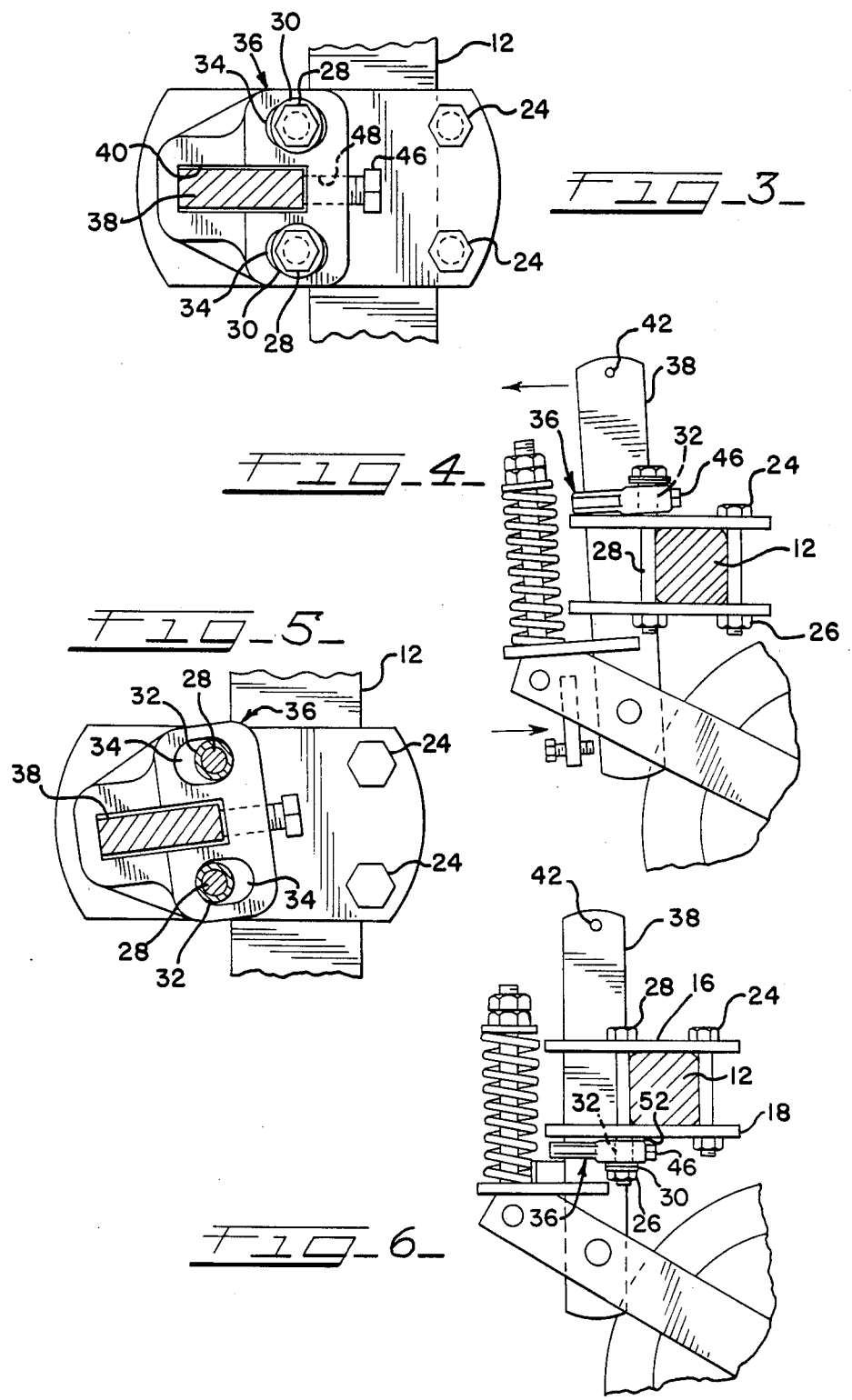

AGRICULTURAL TOOL CLAMP

BACKGROUND OF THE INVENTION

1. Field of the Invention

The invention relates to a field of agricultural tools pulled by motive power sources such as tractors and in particular, to the clamping arrangement for attaching such tools to a tool bar or cross bar behind such a tractor. Typically, these are bulky affairs, difficult to use in applications whereby space is limited. Additionally, it is necessary to provide for height adjustment to accommodate various soil and crop conditions. Providing for such adjustment while at the same time maintaining the strength and durability of the device usually adds to the bulk and expense of the clamp.

Description of Prior Art

The prior art includes various clamping arrangements used to support liquid fertilizer applicators and other such implements. Clamps of this type are shown in the following examples of prior art.

Johnston U.S. Pat. No. 2,988,025 illustrates a liquid applicator supported by a clamp comprising two vertical clamp members bolted to a tool bar with the agricultural implement mounted on a swing arm pivoting from the top of one of the clamp members.

Dietrich U.S. Pat. No. 3,799,079 illustrates a liquid fertilizer applicator which includes a clamp arrangement having upper and lower clamp plates fixed to a tool bar by bolts but without provision for height adjustment.

Wilt U.S. Pat. No. 3,874,593 covers a spray support frame including a clamping arrangement comprising upper and lower clamp plates fixed to a tool bar by bolts on either side of the bar with a spray mounting arm adjustable for height.

None of the foregoing examples of the prior art discloses anything like the arrangement of this invention wherein a vertical support arm is disposed within slots defined in upper and lower clamp plates adjustably held in place by means of the set screw with clearances provided to absorb horizontal loads created by deflection of the agricultural implement.

SUMMARY OF THE INVENTION

The present invention provides an agricultural clamp arrangement which includes two substantially identical clamp plates, one overlying and the other underlying an agricultural tool bar. The plates are bolted together on the rear side of the tool bar. On the front side of the tool bar, somewhat longer bolts are used to fix the clamp plates and with them, an associated clamp member which may be located either above the overlying plate or below the underlying plate. The clamp member is held loosely in position with vertical clearance provided by bushings slightly longer than the clamp member's height. The bushings pass through slots in the clamp member which are oversized relative to the bushings.

The clamp is provided with a set screw which enters a slot in the clamp member adapted to receive a vertical support bar from which the agricultural implement depends.

By this arrangement, the set screw bears vertical loads only and is not loosened by horizontal loads imposed by obstructions encountered by the implement in use.

DESCRIPTION OF THE DRAWINGS

FIG. 1 is a perspective view of a clamp embodying the present invention and used to mount a coulter to a tool bar.

FIG. 2 is an exploded perspective view of the clamp arrangement.

FIG. 3 is a top plan view of the clamp taken along line 3—3 in FIG. 1.

FIG. 4 is a side plan view of the clamp subjected to a rearward load on the coulter.

FIG. 5 is a top plan view of the clamp, partially sectioned through two of the fastening bolts, subjected to a side, or twisting, load on the coulter.

FIG. 6 is a side plan view of an alternative embodiment of the invention, wherein the clamp member is carried below the bottom clamp plate.

DESCRIPTION OF THE PREFERRED EMBODIMENT

FIG. 1 illustrates an agricultural tool bar clamp 10 embodying the present invention. The clamp is shown attached to a horizontal beam member 12 and supporting a coulter attachment indicated as 14. In this use, the agricultural implement trails behind and below the support beam.

FIG. 2 shows an exploded view of the clamp member as attached to the beam. Upper plate 16 and lower plate 18 are identical in configuration. Defined in each of the plates are four mounting holes 20 and an elongated slot 22 located at the forward end of the plate.

Clamp plates 16 and 18 are fixed to bar 12 by means of short bolts 24 and nuts 26. Each long bolt 28 is inserted through two washers 30 and bushing 32 and then inserted through one of bushing slots 34 in clamp casting 36 which rests on upper clamp plate 16. Long bolts 28 then continue through mounting holes 20 in upper plate 16 and lower plate 18 and the clamp plates are then fixed to bar 12 by the attachment and tightening of nuts 26 to bolts 28.

Each of cylindrical bushings 32 has an inner diameter large enough to accommodate one of bolts 28 and an outer diameter dimensioned so as to be larger than the inner diameter of washer 30 and the diameter of mounting hole 20 but small enough to leave a clearance between the outer surface of bushing 32 and the flat inner surface of bushing slot 34. The length of each of the bushings 32 is dimensioned to be slightly longer than the height of clamp casting 36 at bushing slot 34. Given these dimensions, when the clamp is assembled as described, clamp casting 36 is free to float forward, backward and laterally because of the clearances between bushings 32 and the inner surfaces of bushing slots 34. The clamp casting 36 is free to float vertically because of the clearances provided between washers 30 and clamp plate 16. The vertical clearance is equal to the difference between the length of bushing 32 and the height of clamp casting 36.

The assembly of the unit is completed by the insertion of vertical support arm 38 up through slot 22 in lower plate 18, slot 22 in upper plate 16 and slot 40 in clamp casting 36. Slots 22 are dimensioned to be longer and wider than the horizontal cross section of support bar 38 so as to provide clearance between the support arm and the inner surfaces of slots 22.

Pin 42 is fitted to hole 44 adjacent to the top of support bar 38. Pin 42 acts as a stop to prevent the support arm 38 from accidentally falling from the clamp. Set screw 46 is driven through threaded screw socket 48 into slot 40 in clamp casting 36. When set screw 46 is tightened on support bar 38, it holds the support arm in place against forward end 50 of slot 40. Thus, the vertical load of the weight of the agricultural tool on the clamp is borne by set screw 46 and clamp casting 36.

The operation of the clamp is illustrated in FIGS. 3, 4 and 5. FIG. 3 is a top plan view of the clamp, bearing no load other than the vertical load imposed by the weight of the depending agricultural implement. The vertical support bar 38 is held in the clamp casting 36 by set screw 46, which, with the clamp casting, bears the weight of the coulter and associated apparatus. The height at which the agricultural implement may be carried is adjustable by loosening set screw 46, vertically repositioning support bar 38 and retightening set screw 46.

FIG. 4 is a side elevation of the clamp showing the behavior of the clamp when subjected to a load such as that imposed by an obstacle encountered by the coulter directly in its path. Under such a load, the bottom of support arm 38 is deflected to the rear (to the right in FIG. 3) and the top of support bar 38 along with clamp casting 36 is levered forward as shown. A substantial range of deflection is afforded by the vertical and horizontal clearances provided by the dimensions of bushings 32 and bushing slots 34, as well as the clearance between slots 22 and bar 38.

FIG. 5 is a top plan view partially sectioned to show the behavior of bushings 32 within bushing slots 34 under a side deflection such as that encountered when the coulter receives a glancing blow from an obstacle. Support bar 38 is twisted within oversized slots 22 in upper and lower clamp plates 16 and 18. Clamp casting 36, rigidly held by set screw 46 to support bar 38, is free to twist around bushings 32 so that the twisting of bar 38 within slots 22 absorbs the load on the system.

It is important to note that under the nonvertical load conditions described above, set screw 46 does not bear these loads, which would tend to loosen the vertical setting of the support bar 38.

FIG. 6 illustrates an alternative construction of the clamp embodying the present invention. In certain applications, space available above bar 12 may be extremely limited. Shown in this figure, the clamp casting 36 is carried below lower clamp plate 18 and clamp plate 36 rests on washers 30 as shown. Since bushings 32 are dimensioned slightly longer than the height of clamp casting 36 at bushing slots 34, clearance 52 is provided between the bottom of lower plate 18 and the top of clamp casting 36. In this construction, the clamp behaves in substantially the same ways, under load, as shown in FIGS. 3 and 4, while conserving space above bar 12.

Various features of the invention have been particularly shown and described in connection with the illustrated embodiments of the invention. However, it must be understood that these particular arrangements merely illustrate and that the invention is to be given its fullest interpretation within the terms of the appended claims.

What is claimed is:

1. A clamp arrangement for mounting an agricultural tool to a tool bar adaptable to be carried by a motive power source, said clamp arrangement comprising:
   an upper clamp plate with a plurality of mounting holes defined therein and a slot defined therein to receive a vertical support bar, said upper clamp plate adapted to overlie said tool bar;
   a lower clamp plate substantially identical to said upper clamp plate adapted to be positioned underneath said tool bar;
   a first set of fastening means extending through said corresponding mounting holes in said upper and lower clamp plates clamping said upper and lower clamp plates to said tool bar;
   a vertical support bar, having an upper end and a lower end, extendable through said slots in said upper and lower clamp plates and dimensioned so as to define a clearance between the support bar and the slot in each of said clamp plates, said support bar having an agricultural tool dependent from its lower end;
   a clamp member disposed adjacent to one of said clamp plates, having defined therein a slot adapted to receive said vertical support bar and a plurality of mounting holes corresponding to at least two of the mounting holes in said clamp plates;
   a second set of fastening means extending through said clamp member and said upper and lower plates and providing limited vertical travel to said clamp member; and
   a horizontally disposed set screw adapted to enter said slot of said clamp member to clamp the vertical support bar to the clamp member at a predetermined variable vertical position.

2. A clamp arrangement as in claim 1 wherein each of said fastening means of said second set includes:
   a bolt;
   a nut associated therewith;
   a cylindrical bushing surrounding a portion of said bolt, said bushing surrounded by the associated mounting hole defined in said clamp member, dimensioned to define a clearance between the bushing and the associated mounting hole defined in said clamp member, and having a length greater than the height of the clamp member; and
   an annular restraining means attached to said bolt limiting vertical travel of said clamp member between the upper and lower ends of said bushing.

3. A clamp arrangement as in claim 1 wherein said clamp member is disposed above said upper clamp plate.

4. A clamp arrangement as in claim 1 wherein said clamp member is disposed below said lower clamp plate.

* * * * *